June 2, 1953  J. A. SIEGEL  2,640,460
EXERCISING CAGE
Filed May 20, 1952
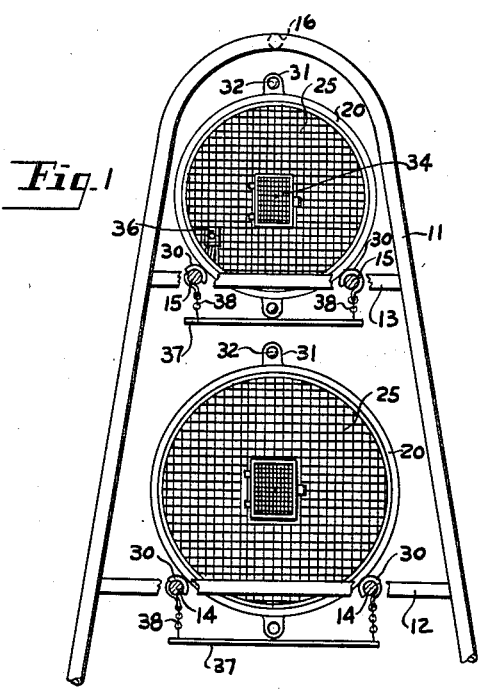
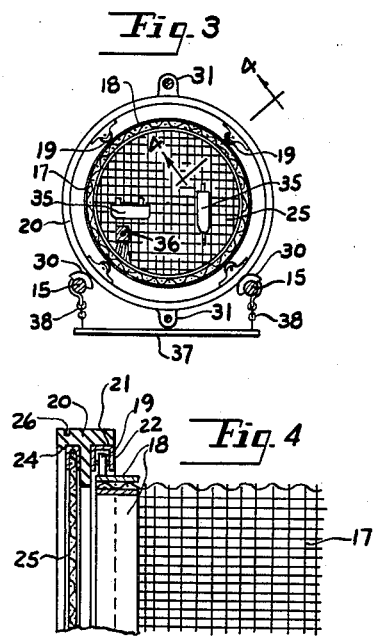
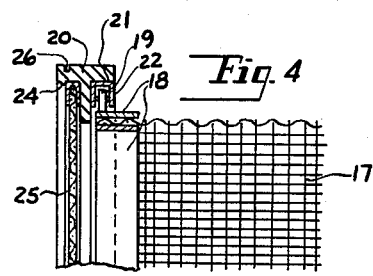
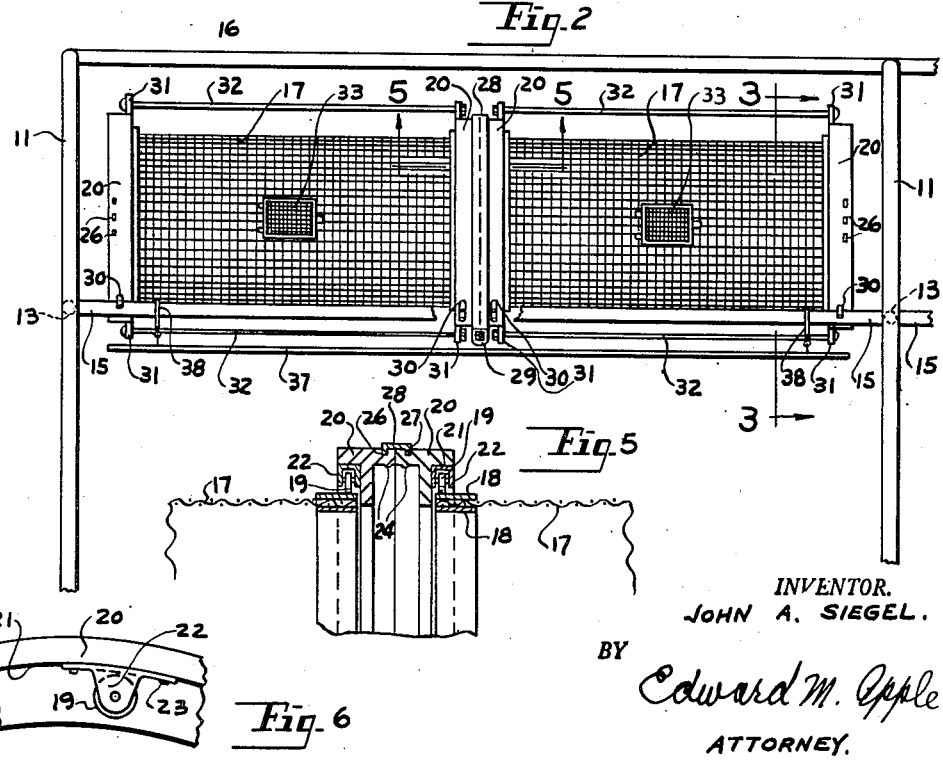
INVENTOR.
JOHN A. SIEGEL.
BY
Edward M. Apple
ATTORNEY.

Patented June 2, 1953

2,640,460

UNITED STATES PATENT OFFICE 2,640,460

EXERCISING CAGE

John A. Siegel, Detroit, Mich.

Application May 20, 1952, Serial No. 288,789

10 Claims. (Cl. 119—17)

The invention relates to cages for birds and animals, and particularly to a cage in which the bird or animal may get its daily exercise.

An object of the invention is to generally improve devices of the character indicated, and to provide an animal and bird exercising cage which is simple in construction, economical to manufacture, and one which may readily be assembled and dis-assembled.

Another object of the invention is the provision of a device of the character indicated, which is formed of a multiplicity of units, each of which is independently mounted for rotation.

Another object of the invention is to provide a multiple unit exercising cage, which is constructed and arranged so that each separate unit may be removed from the assembly and may be used as an animal or bird shipping container.

Another object of the invention is to provide a multiple unit device, which is constructed and arranged so that one or more units in the same tier may be joined together end to end, each of which units may then be used as a separate and independent cage, or they may be made to communicate with one another, whereby to form one continuous cage.

Another object of the invention is to provide a device of the character indicated, which is constructed and arranged with means for automatically dislodging and collecting the animal or bird excreta.

The foregoing and other objects and advantages of the invention will become more apparent as the description proceeds, reference being made from time to time to the accompanying drawing forming part of the within disclosure, in which drawing:

Fig. 1 is an end view of a device embodying the invention with parts in section, and parts broken away for illustrative purposes.

Fig. 2 is a side elevational view of the device illustrated in Fig. 1.

Fig. 3 is a section taken substantially on the line 3—3 of Fig. 2.

Fig. 4 is an enlarged section taken substantially on the line 4—4 of Fig. 3.

Fig. 5 is an enlarged section taken substantially on the line 5—5 of Fig. 2.

Fig. 6 is an enlarged fragmentary detail, showing the means for mounting the cage rollers.

Referring now more particularly to the drawing, it will be understood that in the embodiment herein disclosed, the reference character 11 indicates the upright members of the frame for supporting the cages, as hereinafter described.

Each of the uprights 11 is preferably formed of a continuous length of sufficient length to accommodate two or more tiers of cage units. The uprights 11 are provided with cross members 12 and 13, which are preferably welded thereto. Extending between the cross members 12 of the respective upright members 11, are longitudinal members 14, which are secured to the cross members 12 of the uprights 11 by welding or other suitable means.

Similar longitudinal members 15 extend between the cross members 13 of the uprights 11, and the uprights 11 are joined to one another at the top, by means of a longitudinal member 16, which is likewise preferably welded to the uprights 11. The members 14 and 15 are preferably positioned so that they may accommodate and support the cage units, as hereinafter described.

Each cage unit (Fig. 2) consists of cylindrical member 17, which is preferably formed of a comparatively heavy screen of suitable mesh for the particular bird or animal which it is intended to accommodate. Each screen unit 17 is provided at either end with peripheral metal bands 18, which serve to reinforce the ends of the screen units; the outer bands 18 also serving as tracks for accommodating the rollers 19, on which the cage elements 17 are adapted to rotate.

At either end of each screen element 17, I position a ring 20, each ring 20 having a substantially T shaped cross section, as shown in Figs. 4 and 5. Each ring 20 serves in a multiple capacity. The inside periphery 21 of one flange (Figs. 4, 5, and 6) of the ring 20 serves to hold the roller supports 22, which are secured thereto by spot welding, as at 23 (Fig. 6), or by other suitable means. The other flange of each ring 20 (Fig. 4) is formed with a plurality of detents 24, which serve as retainers for a screen end closure member 25. It will be understood that the rings 20 and the end closure members 25 remain stationary at all times, whereas the screen cage elements 17 may be rotated by a bird or animal walking or running therein the manner that a conventional squirrel cage is rotated. It will also be understood that the end closure members 25 may be left out or removed from the abutting ends of the screen cage elements 17, as shown in Fig. 5, if it is desired that the bird or animal be allowed to communicate between one screen cage unit 17 and the other.

Each ring 20 is also provided with a plurality of slots 26 in its outer periphery (Figs. 2, 4, and 5), which slots 26 are arranged to accommodate inwardly directed fingers 27 (Fig. 5) formed on the locking rings 28, whereby the rings 20 of adjacent cage units are secured together. The ring 28 is preferably split at the bottom, as at 29, the ends being joined by a bolt and nut, or other suitable means.

As shown in Figs. 1, 2, and 3, each ring 20 is provided with a pair of spaced arcuate members 30, which members 30 are adapted to rest on the longitudinal members 14 and 15, whereby the cage units 17 in each tier are supported, and from which they may be readily removed. The rings 20 are also provided with apertured ears 31 through which may be extended the tie rods 32. It will be noted that the tie rods 32 hold the end rings 20 of each unit against displacement. This enables each unit to be removed from the supporting frame, and be utilized as a shipping cage if desired.

Each screen element 17 may be provided with a hinged door 33, and each end closure member 25 is preferably formed with a hinged door 34. Feeding units 35 (Fig. 3) may also be secured to the end closure members 25.

Each cage unit 17 is also preferably provided with a long brush 36, which is supported at either end by the end closure members 25 of each unit. The bristles of the brush 36 are adapted to wipe the inside periphery of each screen unit 17 of the bird and animal excreta as the unit 17 rotates, which excreta falls through the bottom of the screen into the collecting pans 37, which are suspended beneath each cage unit by chains and hooks 38, which engage the longitudinal members 14 and 15 of the frame structure.

It is believed that the functioning of the device is apparent from the description.

Having described my invention, what I claim and desire to secure by Letters Patent is:

1. In a device of the character described, in combination, a supporting frame having pairs of longitudinal members arranged in spaced relation, and at least two cage units supported for independent rotation on each pair of said longitudinal members, each of said cage units having a fixed ring at either end and a rotatable central section.

2. The structure of claim 1, in which each of said fixed rings has a pair of spaced arcuate members arranged to engage a pair of the said longitudinal members and be supported thereby.

3. The structure of claim 1, in which each of said fixed rings has inwardly directed retainers for removably supporting a cage end closure member.

4. The structure of claim 1, in which each of said fixed rings has a substantially T shaped cross section, one arm of the T having brackets with rollers thereon for rotatably supporting the said central section.

5. The structure of claim 1, in which each of said fixed rings has a pair of outwardly extending apertured peripheral ears, and tie rods connecting the ears of one ring with the ears of the other ring in the same unit.

6. The structure of claim 1, in which each of said fixed rings has a plurality of peripheral slots, a locking ring having inwardly extending fingers arranged to be received in said slots, whereby two of said fixed rings of different units may be secured together to form an elongated cage.

7. The structure of claim 1, in which each of said fixed rings is provided with a cage end closure member, and a brush in each of said cage units having its bristles arranged to wipe the inside periphery of said rotatable central section, and means for supporting said brush on said end closure members.

8. The structure of claim 1, including a pan suspended below each of said cage units, each of said pans having means for attaching it to said longitudinal members.

9. A cage unit comprising a pair of fixed rings held in spaced relation by means of tie rods, each of said rings having a cage end closure member removably supported therein, and a tubular element formed of screen rotatably supported at either end by rollers carried by said rings.

10. In a device of the character described, in combination, at least two vertically positioned supporting elements, pairs of horizontal members connecting said supporting members, at least two independently rotatable cage units removably supported on each pair of said horizontal members, each of said cage units consisting of a central section made of screen and a pair of rings, each ring having arcuate lugs thereon for supporting the ring on one pair of horizontal members, a cage end closure member supported by each ring, and rollers on each said ring for rotatably supporting said central screen portion.

JOHN A. SIEGEL.

References Cited in the file of this patent

UNITED STATES PATENTS

| Number | Name | Date |
|---|---|---|
| 80,561 | Osborn | Aug. 4, 1868 |
| 189,251 | Mook | Apr. 3, 1877 |
| 277,724 | Hendryx | May 15, 1883 |
| 958,821 | Prinz | May 24, 1910 |
| 1,258,684 | Johnson | Mar. 12, 1918 |
| 1,632,380 | Marcus | June 14, 1927 |
| 1,971,474 | Bartlett | Aug. 29, 1934 |
| 1,981,096 | Dubus | Nov. 20, 1934 |